United States Patent [19]
Wilkinson

[11] 3,727,592
[45] Apr. 17, 1973

[54] ELECTRONIC FUEL INJECTION SYSTEM

[75] Inventor: Lester Wilkinson, Kokomo, Ind.

[73] Assignee: General Motors Corporation, Detroit, Mich.

[22] Filed: Nov. 15, 1971

[21] Appl. No.: 198,652

[52] U.S. Cl. ............................ 123/32 EA, 123/32 R
[51] Int. Cl. ......................................... F02b 3/00
[58] Field of Search ........................... 123/32 EA

[56] References Cited

UNITED STATES PATENTS

| | | | |
|---|---|---|---|
| 3,587,536 | 6/1971 | Inoue | 123/32 EA |
| 3,522,794 | 8/1970 | Reichardt | 123/32 |

*Primary Examiner*—Laurence M. Goodridge
*Assistant Examiner*—Ronald B. Cox
*Attorney*—E. W. Christen et al.

[57] ABSTRACT

In an internal combustion engine, the operation of at least a pair of fuel injectors is switched from independent energization per engine cycle to simultaneous energization when the amplitude of a speed signal is below the amplitude of a reference signal at the initiation of a timing pulse. The amplitude of the speed signal increases over the duration of a first portion of each engine cycle so that the amplitude of the speed signal is inversely related to the speed of the engine. The timing pulse is initiated at the expiration of a second portion of each engine cycle terminating within the first portion. The amplitude of the reference signal is substantially constant at a voltage level corresponding to an engine speed at which the maximum time period available for independent energization of each of the fuel injectors per engine cycle approaches the desired energization time period for each of the fue injectors per engine cycle.

3 Claims, 4 Drawing Figures

ELECTRONIC FUEL INJECTION SYSTEM

This invention relates to an electronic fuel injection system for an internal combustion engine.

According to one aspect of the invention, the operation of at least a pair of fuel injectors is switched from independent energization per engine cycle to simultaneous energization per engine cycle when the amplitude of a speed signal is below the amplitude of a reference signal at the initiation of a timing pulse. The amplitude of the speed signal increases over the duration of a first portion of each engine cycle so that the amplitude of the speed signal is inversely related to the speed of the engine. The timing pulse is initiated at the expiration of a second portion of each engine cycle terminating within the first portion. The amplitude of the reference signal is substantially constant at a voltage level corresponding to an engine speed at which the maximum time period available for independent energization of each of the fuel injectors per engine cycle approaches the desired energization time period for each of the fuel injectors per engine cycle.

In another aspect of the invention, each engine cycle is divided into at least first and second operating stages of approximately equal duration proportional to the duration of the engine cycle. Further, at least first and second fuel injectors are provided for applying fuel to the engine when energized by injection pulses each initiated in response to the onset of the first and second operating stages and each having a duration determined as a function of at least one engine operating parameter. Specifically, the first fuel injector is energized by injection pulses initiated in response to the onset of the first operating stage. Similarly, the second fuel injector is energized by injection pulses initiated in response to the onset of the second operating stage when the amplitude of the speed signal exceeds the amplitude of the reference signal at the initiation of a timing pulse. However, when the amplitude of the reference signal exceeds the amplitude of the speed signal at the initiation of a timing pulse, the second fuel injector is energized by injection pulses initiated in response to the first operating stage only. In this manner, the maximum duration of the injection pulses is extended beyond the duration of either one of the first and second operating stages.

These and other aspects and advantages of the invention may be best understood by reference to the following detailed description of a preferred embodiment when considered in conjunction with the accompanying drawings.

Figure 1:
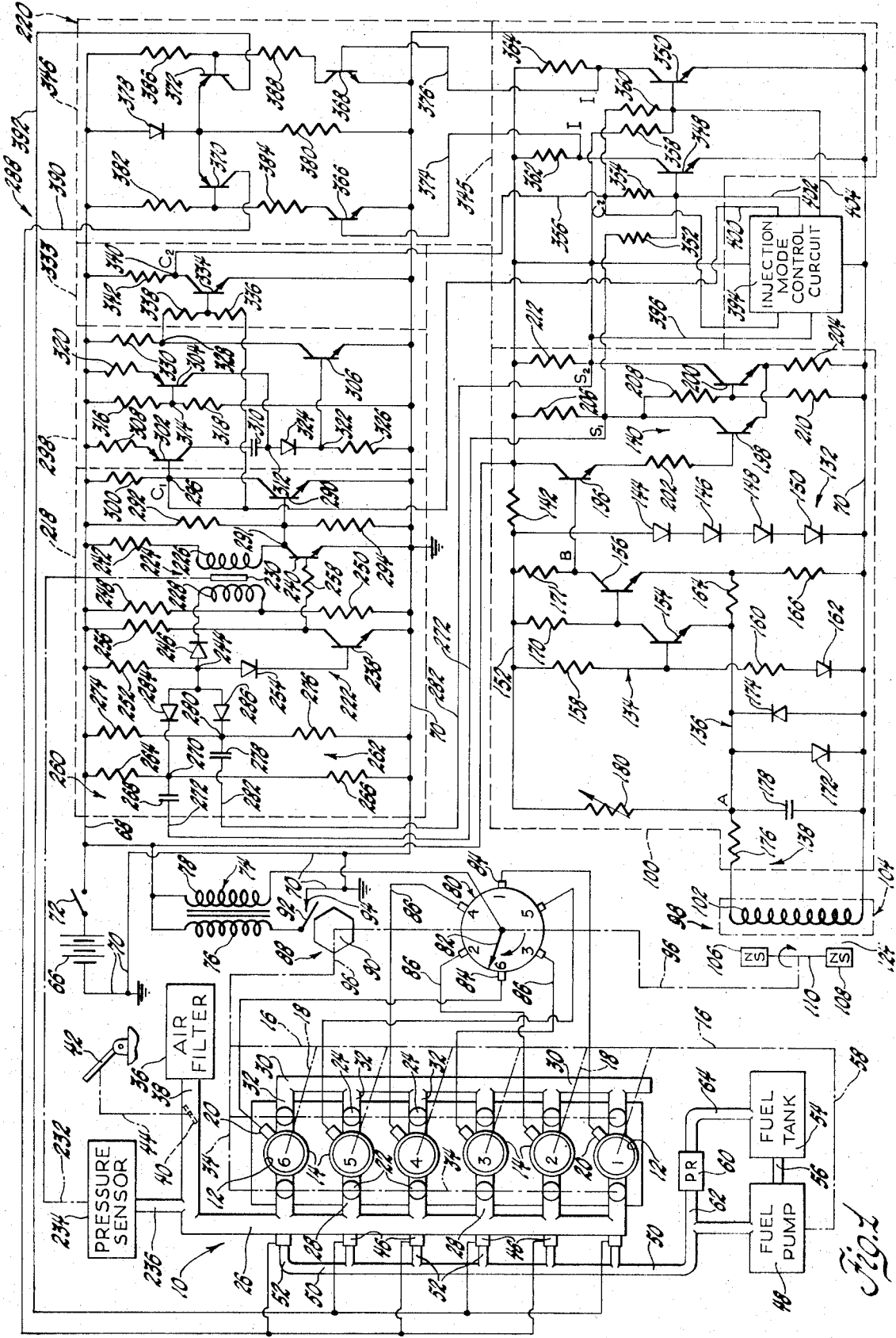
FIG. 1 is a schematic diagram of an electronic fuel injection system incorporating the principles of the invention.

Referring to FIG. 1, a conventional internal combustion engine 10 for an automotive vehicle includes a plurality of combustion chambers or cylinders 12 which are numbered 1–6. Although six cylinders 12 are shown, it will be understood that the engine 10 may have more or less than six cylinders 12 as desired. A plurality of pistons 14 are each reciprocally driven within a different associated one of the cylinders 12 in response to the occurrence of combustion within the cylinders 12. An output shaft or crankshaft 16 is rotatably driven by the pistons 14 through a plurality of connecting rods 18. A plurality of fuel ignitors or spark plugs 20 each cooperate with a different associated one of the cylinders 12 for initiating combustion with the cylinders 12.

A plurality of intake valves 22 each cooperate with a different associated one of the cylinders 12 for regulating the entry of the combustion ingredients or the air/fuel mixture into the cylinders 12 before combustion to charge the cylinders 12. A plurality of exhaust valves 24 each cooperate with a different associated one of the cylinders 12 for regulating the exit of the combustion products or exhaust gases from the cylinders 12 after combustion to discharge the cylinders 12. An induction passage or intake manifold 26 communicates with each of the intake valves 22 through a series of inlet ducts 28 for transmitting the air/fuel mixture to the intake valves 22. An expulsion passage or exhaust manifold 30 communicates with each of the exhaust valves 24 through a series of outlet ducts 32 for receiving the exhaust gases from the exhaust valves 24. Conventionally, the exhaust manifold is connected with an exhaust system including a muffler and a tail pipe. The intake valves 22 and the exhaust valves 24 are slidably driven by the crankshaft 16 through a suitable linkage 34 which normally includes a camshaft, a plurality of rocker arms and a plurality of valve lifters.

Air and fuel are combined within the intake manifold 26 to form the air/fuel mixture. An air filter 36 is disposed across an entrance channel 38 in the intake manifold 26. Air is drawn into the intake manifold 26 through the air filter 36 and the entrance channel 38 for regulating the amount of air drawn into the intake manifold 26 in response to the position of a control element provided by the vehicle accelerator pedal 42 which is connected with the throttle 40 through a suitable linkage 44. A plurality of fuel injectors 46 are each mounted on the intake manifold 26 in cooperation with a different associated one of the cylinders 12 through the inlet ducts 28 and the intake valves 22. Fuel is injected into the intake manifold 26 at a constant flow rate when the fuel injectors 46 are energized. The fuel is deposited into the intake manifold 26 in individual atomized loads generally located within the inlet ducts 28 adjacent the intake valves 22 of the cylinders 12. The amount of fuel constituting each of the atomized fuel loads is determined by the time period during which the fuel injectors 46 are energized by an electronic control system to be more fully described later.

Conventionally, the fuel injectors 46 may each be provided by a valve having a plunger which is driven to a fully open position against a spring bias to apply fuel when a solenoid is energized and which is driven to a fully closed position by the spring bias when the solenoid is deenergized. However, it will be appreciated that the fuel injectors 46 may each be provided by virtually any constant flow rate valve. Further, although six fuel injectors 46 are shown, it is to be noted that the fuel injectors 46 may be more or less in number than the number of cylinders 12.

A fuel pump 48 is connected with each of the fuel injectors 46 through a conduit 50 having a plurality of branch pipes 52. In addition, the fuel pump 48 is connected to a fuel reservoir provided by the vehicle fuel tank 54 through a conduit 56. The fuel pump 48 supplies fuel from the fuel tank 54 to the fuel injectors 46. Preferably, the fuel pump 48 is mechanically driven from the crankshaft 16 through a suitable linkage 58. Alternately, the fuel pump 48 may be electrically driven. A pressure regulator 60 is connected to the conduit 50 through a conduit 62 and is connected to the fuel tank 54 through a conduit 64 for regulating the pressure of the fuel supplied to the fuel injectors 46. Thus, the fuel injectors 46 combine with the fuel pump 48, the fuel tank 54 and the pressure regulator 60 to form a fuel supply system.

An electrical power supply provided by the vehicle battery 66 applies a supply voltage between a power line 68 and a ground line 70 through a control switch provided by the vehicle ignition switch 72. A conventional ignition coil 74 includes a low voltage winding 76 and a high voltage winding 78 which are inductively coupled in the usual manner. A conventional distributor 80 includes a distributor arm 82 cooperating with a plurality of distributor contacts 84 which are numbered 1-6. A plurality of distributor cables 86 connect the individually numbered distributor contacts 84 with the fuel ignitors 20 associated with the correspondingly numbered cylinders 12. A conventional breaker arrangement 88 includes a breaker cam 90 having six lobes cooperating with a breaker arm 92 and a breaker contact 94. The high voltage winding 78 of the ignition coil 74 is connected between the power line 68 and the distributor arm 82. The low voltage winding 76 of the ignition coil 74 is connected between the power line 68 and the breaker arm 92. The breaker contact 94 is connected directly to the ground line 70. The distributor arm 82 and the breaker cam 90 are rotatably driven, as indicated by the arrows, from the crankshaft 16 through a distributor shaft 96 which makes a single revolution during each operating cycle of the engine 10.

As the breaker cam 90 is rotated by the distributor shaft 96, it repeatedly moves the breaker arm 92 into and out of engagement with the breaker contact 94 six times during each revolution of the breaker cam 90 to develop a series of low voltage ignition pulses in the low voltage winding 76. The low voltage ignition pulses in the low voltage winding 76 are transformed into high voltage ignition pulses in the high voltage winding 78 which applies the high voltage ignition pulses to the distributor arm 82. As the distributor arm 82 is rotated by the distributor shaft 96, it successively engages each of the distributor contacts 84 once during each revolution of the distributor arm 82 to apply the high voltage ignition pulses to energize the fuel ignitors 20 through the respective distributor cables 86. The fuel ignitors 20 each generator an ignition spark when energized in response to the application of a high voltage ignition pulse. The ignition spark fires the associated one of the cylinders 12 by igniting the air/fuel mixture to initiate combustion. Thus, the fuel ignitors 20 combine with the ignition coil 74, the distributor 80 and the breaker arrangement 88 to form a fuel ignition system for the engine 10.

It will now be apparent that for any given one of the cylinders 12, the associated one of the fuel injectors 46 must be energized to apply a fuel load to the cylinder before the associated one of the fuel ignitors 20 is energized to apply an ignition spark to the cylinder. In other words, the fuel injection function must precede the fuel ignition function. Consequently, the fuel injection order as determined by the fuel injection system must be synchronized with the fuel ignition order as determined by the fuel ignition system. In the illustrated engine 10, the fuel ignition order or firing order of the cylinders 12 is defined by the distributor 80 as one-five-three-six-two-four. Thus, the fuel ignitors 20 are energized sequentially. However, it is not necessary that the fuel injectors 46 be energized sequentially. It has been found that satisfactory operation of the engine 10 can be achieved by alternately simultaneously energizing two separate banks of the fuel injectors 46. Accordingly, based on the ignition order, the cylinders 12 may be divided into first and second banks of sequentially ignited or fired cylinders. For the sake of simplicity, it is assumed that in the illustrated engine 10, the first bank includes cylinders one-five-three and the second bank includes cylinders six-two-four. However, it is to be understood that the first and second banks may be composed of any desired combination of sequentially fired cylinders. Thus, the first bank might include cylinders two-four-one-five and the second bank might include cylinders three-six.

Based on the firing order, an engine operating cycle may be defined to extend from before the firing of the first fired cylinder in the first bank until after the firing of the last fired cylinder in the second bank. Hence, in the illustrated engine 10, an engine operating cycle extends from before the firing of cylinder one until after the firing of cylinder four. Consequently, depending upon which of the cylinders 12 are selected to compose the first and second banks, the engine operating cycle may be separated into first and second operating stages. The first operating stage may be defined to extend from between the firing of the last fired cylinder in the second bank and the firing of the first fired cylinder in the first bank to between the firing of the last fired cylinder in the first bank and the firing of the first fired cylinder in the second bank. The second operating stage may be defined to extend from between the firing of the last fired cylinder in the first bank and the firing of the first fired cylinder in the second bank to between the firing of the last fired cylinder in the second bank and the firing of the first fired cylinder in the first bank. Thus, in the illustrated engine 10, the first operating stage extends from between the firing of the cylinder four and the firing of the cylinder one to between the firing of the cylinder three and the firing of the cylinder six, and the second operating stage extends from between the firing of the cylinder three and the firing of the cylinder six to between the firing of the cylinder four and the firing of the cylinder one.

In addition, corresponding to the chosen division of the cylinders 12 into the first and second banks, the fuel injectors 20 and the fuel ignitors 46 may also be divided into first and second groups. For the illustrated engine 10, the ones of the fuel ignitors 20 associated with the cylinders one-five-three in the first bank form a first group of the fuel ignitors 20 and the ones of the fuel ignitors 20 associated with the cylinders six-two-four form a second group of the fuel ignitors 20. Similarly, the ones of the fuel injectors 46 associated with the cylinders one-five-three in the first bank form a first group of the fuel injectors 46 and the ones of the fuel injectors 46 associated with the cylinders six-two-four in the second bank form a second group of the fuel injectors 46.

Synchronization of the fuel injection order with the fuel ignition order may now be accomplished on a noninterferring time division basis in accordance with the occurrence of the first and second operating stages of each engine operating cycle. During the first operating stage, the first group of the fuel ignitors 20 is energized to ignite fuel within the first bank of the cylinders 12 and the second group of the fuel injectors 46 is energized to apply fuel to the second bank of the cylinders 12. Conversely, during the second operating stage, the second group of the fuel ignitors 20 is energized to ignite fuel within the second bank of the cylinders 12 and the first group of the fuel injectors 46 is energized to apply fuel to the first bank of the cylinders 12.

Figure 2:
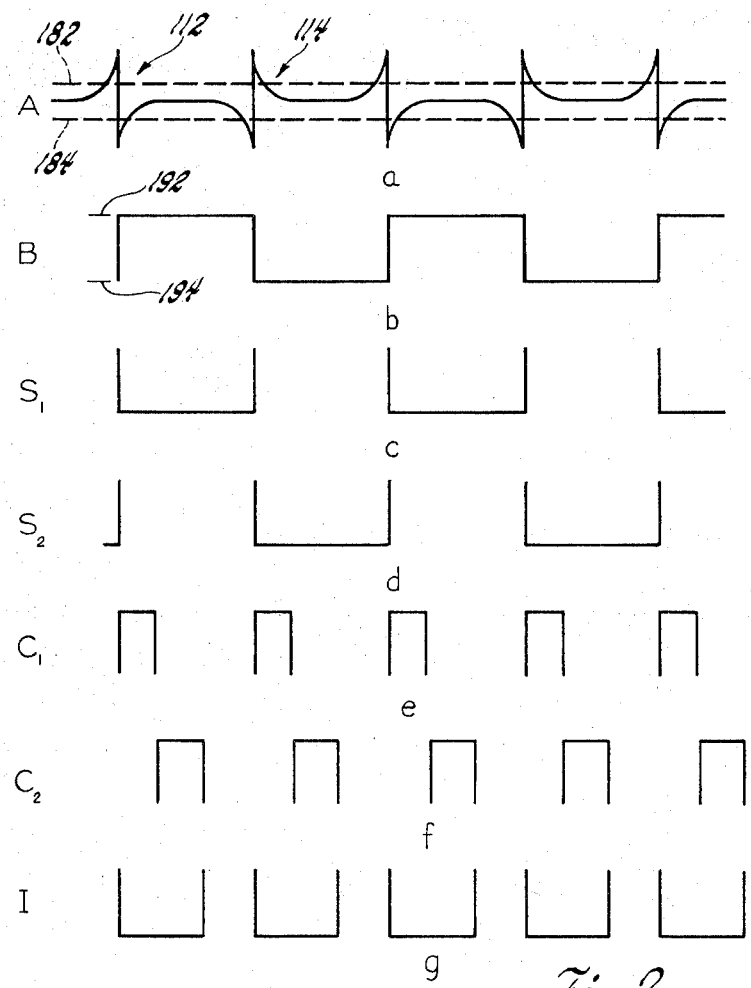
FIG. 2 is a graphic diagram of several waveforms useful in explaining the operation of the electronic fuel injection system illustrated in FIG. 1.

Referring again to FIG. 1, an electronic fuel injection control system incorporates a timing apparatus for synchronizing the fuel injection order with the fuel ignition order in the manner previously set forth. The timing apparatus or timing pulse generator includes a timing transducer 98 and a timing circuit 100. The timing transducer 98 includes a winding 102 mounted on a stator 104 and a pair of permanent magnets 106 and 108 mounted on a rotor 110. The permanent magnets 106 and 108 are oppositely poled with respect to the winding 102. Preferably, the rotor 110 is rotatably driven relative to the stator 104 by the distributor shaft 96 in synchronization with the occurrence of the first and second operating stages of each engine operating cycle. As the rotor 110 is driven relative to the stator 104, the permanent magnets 106 and 108 are alternately carried into and out of magnetic coupling relationship with the winding 102. As a result, an input signal A having alternate first and second timing pulse pairs 112 and 114 is induced in the winding 102, as shown in FIG. 2a, during each revolution of the permanent magnets 106 and 108. For a more detailed description of the timing transducer 98, reference may be made to U. S. Pat. application Ser. No. 36,055.

The first timing pulse pair 112 exhibits a positive-to-negative polarity transition occurring at the onset of the first operating stage of each engine operating cycle. The second timing pulse pair 114 exhibits a negative-to-positive polarity transition occurring in response to the onset of the second operating stage of each engine operating cycle. The significance of these characteristics of the first and second timing pulse pairs 112 and 114 will become more apparent later. However, it is to be understood that the designation of the timing pulse pair 112 as the first timing pulse pair and the designation of the timing pulse pair 114 as the second timing pulse pair is purely arbitrary. Consequently, the respective designations of the first and second timing pulse pairs 112 and 114 may be reversed without affecting the invention in any way.

In the manner previously described, the distributor shaft 96 drives the rotor 110 relative to the stator 104, as indicated by the arrows, so that the permanent magnets 106 and 108 are alternately carried past the winding 102 to induce the first and second timing pulse pairs 112 and 114 in the winding 102 during each revolution of the permanent magnets 106 and 108. More specifically, when the permanent magnets 106 and 108 pass the winding 102, magnetic flux generated by the permanent magnets 106 and 108 links the winding 102 across an air gap 124.

As the permanent magnets 106 and 108 alternately move toward the winding 102, magnetic flux increases across the air gap 124. The magnetic flux reaches a maximum when the centerline of the permanent magnets 106 and 108 coincides with the centerline of the winding 102. As the permanent magnets 106 and 108 alternately move away from the winding 102, the magnetic flux decreases across the air gap 124. Due to the reverse polarity of the permanent magnets 106 and 108 with respect to the winding 102, the direction of the magnetic flux generated within the flux path by the respective permanent magnets 106 and 108 is reversed.

Referring to FIG. 2a, the magnitude of the input signal A induced within the winding 102 to form the first and second timing pulse pairs 112 and 114 is proportional to the rate of change of the magnetic flux generated across the air gap 124. Accordingly, the timing transducer 98 is speed sensitive. Further, since the magnitude of the voltage induced within the winding 102 is equal to the first derivative with respect to time of the magnetic flux generated across the air gap 124, the timing transducer 98 is also position sensitive. The magnitude of the first and second timing pulse pairs 112 and 114 is nominally centered about a reference level which is equal to zero.

As the permanent magnet 106 moves toward the winding 102, the magnetic flux linking the winding 102 across the air gap 124 increases in a clockwise direction. The flux increase is initially gradual and subsequently more rapid. Consequently, the magnitude of the positive polarity timing pulse in the first timing pulse pair 112 initially rises gradually in a positive direction to a maximum level and subsequently falls sharply to the reference level. When the centerline of the permanent magnet 106 coincides with the centerline of the winding 102, the magnetic flux is at a maximum but the rate of change of flux is zero. Therefore, the first timing pulse pair 112 experiences a positive-to-negative polarity transition occurring at this point. As the permanent magnet 106 moves away from the winding 102, the magnetic flux linking the winding 102 across the air gap 124 decreases in the clockwise direction. The flux decrease is initially rapid and subsequently more gradual. Accordingly, the negative polarity pulse in the first timing pulse pair 112 initially falls sharply to a minimum level and subsequently rises gradually toward the reference level. Due to the residual magnetism of the winding 102, the negative polarity pulse never quite reaches the reference level. As the permanent magnet 108 passes the winding 102, the operation is identical except that the polarities of the pulses in the second timing pulse pair 114 are opposite to the polarities of the pulses in the first timing pulse pair 112. This is due to the fact that the magnetic flux produced by the permanent magnet 108 is in a counterclockwise direction rather than a clockwise direction.

The timing circuit 100 includes a voltage regulator 132, a bistable multivibrator or flip-flop 134, a clipper 136, a filter 138 and a trigger circuit 140. The voltage regulator 132 includes a resistor 142 and a plurality of diodes 144, 146, 148 and 150 connected in series between the power line 68 and the ground line 70. A low voltage supply line 152 is connected to the junction between the resistor 142 and the diode 144. The supply voltage applied to the supply line 152 is determined by the voltage divider action provided by the resistor 142 in conjunction with the diodes 144, 146, 148 and 150.

The bistable multivibrator 134 includes first and second switching transistors 154 and 156 of the NPN junction type. The base electrode of the transistor 154 is connected through a biasing resistor 158 to the supply line 152 and through a biasing resistor 160 and a diode 162 to the ground line 70. The diode 162 provides a temperature compensation for the transistor 154. The emitter electrode of the transistor 154 is connected with the emitter electrode of the transistor 156 through a biasing resistor 164. Further, the emitter electrode of the transistor 156 is connected through a biasing resistor 166 to the ground line 70. The collector electrode of the transistor 154 and the base electrode of the transistor 156 are both connected through a biasing resistor 170 to the supply line 152. The collector electrode of the transistor 156 is connected through a biasing resistor 171 to the supply line 152.

The clipper 136 includes a pair of diodes 172 and 174 connected in back-to-back relationship between the emitter electrode of the transistor 154 and the ground line 70. The filter 138 comprises a resistor 176 and a capacitor 178. The resistor 176 is connected between the emitter electrode of the transistor 154 and one terminal of the winding 102. The capacitor 178 is connected between the emitter electrode of the transistor 154 and the ground line 70. An input voltage level adjustment element is provided by a variable resistor 180 connected between the emitter electrode of the transistor 154 and the supply line 152.

Referring to FIGS. 1 and 2a, the first and second timing pulse pairs 112 and 114 are applied across the winding 102 of the timing transducer 98 as previously described. The filter 138 attenuates any spurious noise signals induced within the winding 102 to prevent false switching of the bistable multivibrator 134. The bistable multivibrator 134 exhibits an upper toggle level 182 and a lower toggle level 184 as will be more fully explained later. The variable resistor 180 is adjusted to apply a bias voltage level to the emitter electrode of the transistor 154 to shift the reference voltage level 126 of the first and second timing pulse pairs 112 and 114 to a voltage level nominally midway between the upper and lower toggle levels 182 and 184. The clipper 136 limits the magnitude of the first and second timing pulse pairs 112 and 114 at an upper limiting level above the upper toggle level 182 and at a lower limiting level below the lower toggle level 184. The upper limiting level is defined by the forward voltage drop of the diode 172 while the lower limiting level is defined by the forward voltage drop of the diode 174.

The bistable multivibrator 134 switches between first and second stable states in response to the first and second timing pulse pairs 112 and 114. In the first stable state, the transistor 154 is fully conductive in a saturated condition and the transistor 156 is fully nonconductive in a cutoff condition. With the transistor 154 turned on and the transistor 156 turned off, the resistors 158, 160, 164, 166 and 168 and the diode 162 establish the upper toggle level 182 above which the voltage of the emitter electrode of the transistor 154 must rise in order to drive the multivibrator 134 into the second stable state. In the second stable state, the transistor 156 is fully conductive in a saturated condition and the transistor 154 is fully nonconductive in a cutoff condition. With the transistor 156 turned on and the transistor 154 turned off, the resistors 158, 160, 164, 166 and 170 and the diode 162 establish the lower toggle level 184 below which the voltage applied to the emitter electrode of the transistor 154 must fall in order to drive the monostable multivibrator 134 into the first stable state. The clipper 136 applies the filtered, shifted and limited first and second timing pulse pairs 112 and 114 to the emitter electrode of the transistor 154.

Assuming the bistable multivibrator 134 is in the second stable state, when the magnitude of the negative polarity pulse 116 in the first timing pulse pair 112 falls below the lower toggle level 184, the bias voltage applied to the transistor 154 by the resistors 158, 160, 164, 166 and 170 and the diode 162 renders the transistor 154 fully conductive. With the transistor 154 turned on, the bias voltage applied to the transistor 156 by the resistors 164, 166 and 168 renders the transistor 156 fully nonconductive. Since the transistor 154 is turned on and the transistor 156 is turned off, the multivibrator 134 is in the first stable state. Consequently, when the positive polarity timing pulse 118 in the second timing pulse pair 114 rises above the upper toggle level 182, the bias voltage applied to the transistor 154 by the resistors 158, 160, 164 and 168 and the diode 162 renders the transistor 154 fully nonconductive. With the transistor 154 turned off, the bias voltage applied to the transistor 156 by the resistors 166 and 168 renders the transistor 156 fully conductive. Since the transistor 156 is turned on and the transistor 154 is turned off, the bistable multivibrator 134 is in the second stable state.

Referring to FIGS. 1 and 2b, the bistable multivibrator 134 produces a bilevel timing signal B having an upper level 192 and a lower level 194. The timing signal B appears at the collector electrode of the transistor 156 from which it is applied to the trigger circuit 140. When the multivibrator 134 is in the first stable state with the transistor 156 in the fully nonconductive condition, the timing signal B is at the upper level 192 as defined by the voltage divider action of the resistor 170 and the input impedance of the trigger circuit 140. When the multivibrator 134 is in the second stable state with the transistor 156 in the fully conductive condition, the timing signal B is at the lower level 194 as defined by the voltage divider action of resistors 166 and 170. Thus, the timing signal B undergoes a upper-to-lower level transition substantially in response to the occurrence of a positive-to-negative polarity transition in the first timing pulse pair 112. Similarly, the timing signal B undergoes a lower-to-upper level transition substantially in response to the occurrence of a negative-to-positive polarity transition in the second timing pulse pair 114.

The timing trigger circuit 140 includes an input transistor 196, and first and second trigger transistors 198 and 200, all of the NPN junction type. The base electrode of the transistor 196 is connected with the collector electrode of the transistor 156 in the bistable multivibrator 134. The emitter electrode of the transistor 196 is connected through a feed resistor 202 to the base electrode of the transistor 198. The collector electrode of the transistor 196 is connected directly to the power line 68. The emitter electrodes of the transistors 198 and 200 are connected through a biasing resistor 204 to the ground line 70. The collector electrode of the first trigger transistor 198 is connected through an output resistor 206 to the power line 68. The base electrode of the second trigger transistor 200 is connected through a biasing resistor 208 to the collector electrode of the transistor 198 and through a biasing resistor 210 to the ground line 70. The collector electrode of the transistor 200 is connected through an output resistor 212 to the power line 68.

The input transistor 196 is connected in an emitter follower configuration to present a high input impedance to the bistable multivibrator 134 as previously described. In addition, the transistor 196 amplifies the timing signal B and applies it through the resistor 202 to the base electrode of the transistor 198. The first and second trigger transistors 198 and 200 form a Schmidt trigger circuit for providing a first stage pulse $S_1$ at the collector of the transistor 198 and for providing a second stage pulse $S_2$ at the collector of the transistor 200 as shown in FIGS. 2c and 2d. When the timing signal B shifts to the upper level 192, the bias voltage applied to the transistor 198 by the resistors 202 and 204 and the transistor 196 renders the transistor 198 fully conductive to initiate a first stage pulse $S_1$ at a voltage level primarily determined by the voltage divider action of the resistors 204 and 206 as shown in FIG. 2c. As the transistor 198 turns on, the bias voltage applied to the transistor 200 by resistors 204, 206, 208 and 210 renders the transistor 200 fully nonconductive to terminate the second stage pulse $S_2$.

When the timing signal B shifts to the lower level 194, the bias voltage applied to the transistor 198 by the resistors 202 and 204 and the transistor 196 renders the transistor 198 fully nonconductive to terminate the first stage pulse $S_1$. As the transistor 200 by the resistors 204, 206, 208 and 210 renders the transistor 200 fully conductive to initiate a second stage pulse $S_2$ at a voltage level primarily determined by the voltage divider action of the resistors 204 and 212. Hence, the trigger circuit 140 produces a first stage pulse $S_1$ having a time period extending from each lower-to-upper level transition to the next upper-to-lower level transition in the timing signal B. Further, the trigger circuit 140 produces a second stage pulse $S_2$ having a time period extending from each upper-to-lower level transition to the next lower-to-upper level transition in the timing signal B. The trigger circuit 140 applies the first and second stage pulses $S_1$ and $S_2$ to a first control pulse generator 218 and a fuel injector driver 220.

The first control pulse generator 218 includes a monostable multivibrator or blocking oscillator 222. The blocking oscillator 222 includes a control transducer 224 having a primary winding 226 and a secondary winding 228 which are variably inductively coupled through a movable magnetizable core 230. The deeper the core 230 is inserted into the primary and secondary windings 226 and 228, the greater the inductive coupling between the primary winding 226 and the secondary winding 228. The movable core 230 is mechanically connected through a suitable linkage 232 with a pressure sensor 234. The pressure sensor 234 communicates with the intake manifold 26 of the engine 10 downstream from the throttle 40 through a duct 236 to monitor the negative pressure or vacuum within the intake manifold 26. The pressure sensor 234 moves the core 230 within the primary and secondary windings 226 and 228 of the control transducer 224 to regulate the inductive coupling between the primary and secondary windings 226 and 228 as an inverse function of the vacuum within the intake manifold 26. Therefore, as the vacuum within the intake manifold 26 decreases in response to the opening of the throttle 40, the core 230 is inserted deeper within the primary and secondary windings 226 and 228 to proportionately increase the inductive coupling between the primary winding 226 and the secondary winding 228.

The blocking oscillator 222 further includes first and second control transistors 238 and 240 of the NPN junction type. The primary winding 226 is connected from the collector electrode of the transistor 240 through a limiting resistor 242 to the power line 68. The secondary winding 228 is connected from an input junction 244 through a steering diode 246 to a junction between a pair of biasing resistors 248 and 250 which are connected in series between the power line 68 and the ground line 70. A biasing resistor 252 is connected between the junction 244 and the power line 68. The base electrode of the transistor 238 is connected through a steering diode 254 to the junction 244. The emitter electrodes of the transistors 238 and 240 are connected directly to the ground line 70. The collector electrode of the transistor 238 is connected through a biasing resistor 256 to the power line 68 and through a biasing resistor 258 to the base electrode of the transistor 240.

The first control pulse generator 218 further includes first and second differentiators 260 and 262. The first differentiator 260 is provided by a pair of resistors 264 and 266 and a capacitor 268. The resistors 264 and 266 are connected in series between the power line 68 and the ground line 70. The capacitor 268 is connected from a junction 270 between the resistors 264 and 266 to the collector electrode of the first trigger transistor 198 in the trigger circuit 140 through a first timing line 272. The second differentiator 262 includes a pair of resistors 274 and 276 and a capacitor 278. The resistors 274 and 276 are connected in series between the power line 68 and the ground line 70. The capacitor 278 is connected from a junction 280 between the resistors 274 and 276 to the collector electrode of the second trigger transistor 200 in the trigger circuit 140 through a second timing line 282. A steering diode 284 is connected between the junction 244 and the junction 270 in the first differentiator 260. Similarly, a steering diode 286 is connected between the junction 244 and the junction 280 in the second differentiator 262. Accordingly, the transistor 238 is turned on through the coupling action of the diode 254 and the transistor 240 is turned off through the biasing action of the resistor 258 to terminate the first control pulse $C_1$. Thus, the time duration of the first control pulses $C_1$ appearing at the collector electrode of the transistor 240 is regulated by the pressure sensor 234 and the control transducer 226 as an inverse function of the vacuum within the intake manifold 26 of the engine 10.

In addition, the first control pulse generator 218 includes an output transistor 290. The base electrode of the transistor 290 is connected directly to the collector electrode of the transistor 240 at a junction 291. A biasing resistor 292 is connected between the base electrode of the transistor 290 and the power line 68. Similarly, a biasing resistor 294 is connected between the base electrode of the transistor 290 and the ground line 70. The collector electrode of the transistor 290 is connected directly to a junction 296 in a second control pulse generator 298. A biasing resistor 300 is connected between the junction 296 and the power line 68.

Since the first control pulse generator 218 is only incidental to the present invention, it will not be described in great detail. In operation, the first stage pulses $S_1$ are applied via the line 272 to the first differentiator 260 and the second stage pulses $S_2$ are applied via the line 282 to the second differentiator 262. The first differentiator 260 develops a negative trigger pulse at the junction 270 in response to the initiation of each first stage pulse $S_1$. This negative trigger pulse is applied through the diode 284 to the junction 244. Likewise, the second differentiator 262 develops a negative trigger pulse at the junction 280 in response to the initiation of each second stage pulse $S_2$. This negative trigger pulse is applied through the diode 286 to the junction 244.

The monostable multivibrator or blocking oscillator 222 switches from a stable state to an unstable state in response to an increase in the total voltage at the junction 244 in excess of a predetermined threshold level. Specifically, when the total voltage is above the threshold level, the first control transistor 238 is rendered fully conductive through the coupling action of the diode 254 and the second control transistor 240 is rendered fully nonconductive through the biasing action of the resistor 258. The resistor 252 continually applies a bias voltage to the junction 244 thereby to normally maintain the total voltage at the junction 244 above the threshold level so that the transistor 238 is normally turned on and the transistor 240 is normally turned off.

When a negative trigger pulse arrives at the junction 244, the total voltage immediately falls below the threshold level. Consequently, the transistor 238 is turned off through the coupling action of the diode 254 and the transistor 240 is turned on through the biasing action of the resistors 256 and 258. With the transistor 240 turned on, the transistor 290 is turned off through the biasing action of the transistor 240. With the transistor 290 turned off, a first control pulse $C_1$, as shown in FIG. 2e, is initiated at the junction 296. The level of the first control pulse $C_1$ is primarily defined by the supply potential on the power line 68.

Further, with the transistor 240 turned on, a current is established in the primary winding 226 of the control transistor 224 to develop a feedback voltage across the secondary winding 228 of the control transducer 224. The feedback voltage is coupled through the diode 246 to keep the total voltage at the junction 244 below the threshold level so that the transistor 238 remains turned off and the transistor 240 remains turned on. The feedback voltage increases from a lower level which is below the threshold level to an upper level which is above the threshold level. The upper level of the feedback voltage is determined by the voltage divider action of the resistors 248 and 250. The lower level of the feedback voltage is determined by the inductive coupling between the primary and secondary windings 226 and 228 as defined by the position of the movable core 230. The rate at which the feedback voltage increases from the lower level to the upper level is fixed by the L/R time constant of the primary winding 226 and the resistor 242.

As the feedback voltage increases, the total voltage at the junction 244 gradually rises above the threshold level. Accordingly, the transistor 238 is turned on through the coupling action of the diode 254 and the transistor 240 is turned off through the biasing action of the resistor 258. With the transistor 240 turned off, the transistor 290 is turned on through the biasing action of the resistors 292 and 294. With the transistor 290 turned on, the first control pulse $C_1$ is terminated at the junction 296. Thus, the time duration of the first control pulses $C_1$ appearing at the collector electrode of the transistor 290 is regulated by the pressure sensor 234 and the control transducer 226 as an inverse function of the vacuum within the intake manifold 26 of the engine 10.

The second control pulse generator 298 includes a pair of PNP junction transistors 302 and 304 and an NPN junction transistor 306. The base electrode of the transistor 302 is connected directly to the junction 296. A biasing resistor 308 is connected between the emitter electrode of the transistor 302 and the power line 68. A timing capacitor 310 is connected between the collector electrode of the transistor 302 and a junction 312. The base electrode of the transistor 302 is connected directly to a junction 314. A biasing resistor 316 is connected between the junction 314 and the power line 68. A biasing resistor 318 is connected between the junction 314 and the ground line 70. A biasing resistor 320 is connected between the emitter electrode of the transistor 304 and the power line 68. The collector electrode of the transistor 304 is connected directly to the junction 312. The base elecrode of the transistor 306 is connected directly to a junction 322. A diode 324 is connected between the junction 312 and the junction 322. A biasing resistor 326 is connected between the junction 322 and the ground line 70. The emitter electrode of the transistor 306 is connected directly to the ground line 70. The collector electrode of the transistor 306 is connected directly to a junction 328. A biasing resistor 330 is connected between the junction 328 and the power line 68.

When the transistor 290 is turned off to initiate a first control pulse $C_1$ at the junction 296, the transistor 302 is rendered conductive in a constant current mode through the biasing action of the resistors 300 and 336.

With the transistor 302 conductive, the capacitor 310 is charged through a path including the transistor 302, the diode 324 and the resistor 326. As a result, the voltage across the capacitor 310 linearly increases in response to the constant current developed through the transistor 302. Normally, the transistor 304 is rendered conductive in a constant current mode through the biasing action of the resistors 316 and 318. With the transistor 304 conductive, the transistor 306 is rendered fully conductive through the biasing action of the diode 324 and the resistor 326. Preferably, one of the resistors 316 and 318 is a temperature sensitive resistor which defines the conductivity of the transistor 304 as a direct function of the overall temperature of the engine 10. Thus, as the temperature of the engine 10 increases, the conductivity of the transistor 304 also increases. The significance of this compensation will become more apparent later.

When the transistor 290 is turned on to terminate the first control pulse $C_1$ at the junction 296, the transistor 302 is turned off through the biasing action of the transistor 290. More specifically, the potential at the base electrode of the transistor 302 is pulled below the potential at the collector electrode of the transistor 302. As the transistor 302 turns off, the potential at the junction 312 instantaneously decreases to turn off the transistor 306 through the biasing action of the diode 324 and the resistor 326. With the transistor 306 turned off, a second control pulse $C_2$, as shown in FIG. 2f, is initiated at the junction 328. The amplitude of the second control pulse $C_2$ is primarily defined by the supply potential on the power line 68. Further, with the transistor 302 turned off, the capacitor 310 is discharged through a path including the transistor 304, the base-collector junction of the transistor 302 and the transistor 290. Consequently, the voltage across the capacitor 310 linearly decreases at a rate determined by the constant current developed through the transistor 304. As previously described, the conductivity of the transistor 304 is directly related to the temperature of the engine 10. As the capacitor 310 discharges, the potential at the junction 312 increases until the transistor 306 is once again rendered fully conductive. With the transistor 306 turned on, the second control pulse $C_2$ is terminated at the junction 348. Thus, the duration of the second control pulse $C_2$ is directly related to the duration of the first control pulse $C_1$ and is inversely related to the temperature of the engine 10.

An injection logic gate 333 is provided by an NPN junction transistor 334. The emitter electrode of the transistor 334 is connected directly to the ground line 70. A biasing resistor 336 is connected between the junction 296 and the base electrode of the transistor 334. Similarly, a biasing resistor 338 is connected between the junction 328 and the base electrode of the transistor 334. The collector electrode of the transistor 334 is connected directly to a junction 340. A limiting resistor 342 is connected between the junction 340 and the power line 68.

The transistor 334 is rendered fully conductive in response to the presence of the first control pulse $C_1$ at the junction 296 or the presence of the second control pulse $C_2$ at the junction 328. Specifically, when the first control pulse $C_1$ is initiated at the junction 296, the transistor 334 is turned on through the biasing action of the resistors 300 and 336. With the transistor 334 turned on, an injection pulse I, as shown in FIG. 2g, is initiated at the junction 340. The amplitude of the injection pulse I is determined by the saturation voltage drop of the transistor 334. As the first control pulse $C_1$ is terminated at the junction 296, the second control pulse $C_2$ is initiated at the junction 328 to maintain the transistor 334 fully conductive through biasing action of the resistors 330 and 338. Since the transistor 334 remains turned on, the injection pulse I is maintained at the junction 340. Subsequently, when the second control pulse $C_2$ is terminated at the junction 328, the transistor 334 is rendered fully nonconductive. With the transistor 334 turned off, the injection pulse I is terminated at the junction 340. Hence, the duration of the injection pulse I is equal to the duration of the first control pulse $C_1$ plus the duration of the second control pulse $C_2$. This relationship permits the first control pulse generator 218 to reset during the duration of the second control pulse $C_2$ and permits the second control pulse generator 298 to reset during the duration of the first control pulse $C_1$.

The fuel injector driver 220 includes a pilot drive circuit 345 and a power drive circuit 346. The pilot drive circuit 290 includes a pair of pilot drive transistors 348 and 350 of the NPN junction type. The base electrode of the transistor 348 is connected through a biasing resistor 352 to the collector electrode of the first trigger transistor 198 in the trigger circuit 140. In addition, the base electrode of the transistor 348 is connected through a biasing resistor 354 and an injection pulse line 356 to the junction 340 at the collector electrode of the transistor 334. The base electrode of the transistor 350 is connected through a biasing resistor 358 to the collector electrode of the second trigger transistor 200 in the trigger circuit 140. Further, the base electrode of the transistor 350 is connected through a biasing resistor 360 and the injection pulse line 356 to the junction 340 at the collector electrode of the transistor 334. The collector electrode of the transistor 348 is connected through an output resistor 362 to the power line 68. Similarly, the collector electrode of the transistor 296 is connected through an output resistor 364 to the power line 68. The emitter electrodes of the transistors 348 and 350 are connected directly to the ground line 70.

The first and second pilot drive transistors 348 and 350 are normally turned on. The first stage pulse $S_1$ is applied to the transistor 348 through the resistor 352. The second stage pulse $S_2$ is applied to the transistor 350 through the resistor 358. The injection pulse 344 is applied to the transistor 348 through the resistor 354 and to the transistor 350 through the resistor 360. The transistor 348 is rendered fully nonconductive in response to the coincidence of a first stage pulse $S_1$ and an injection pulse 344. Likewise, the transistor 350 is rendered fully nonconductive in response to the coincidence of a second stage pulse $S_2$ and an injection pulse 343. A first pilot drive pulse is established at the collector of the transistor 348 across the resistor 362 having a time duration determined by the time period during which the transistor 348 is turned off. Similarly, a second pilot drive pulse is established at the collector electrode of the transistor 350 across the resistor 364 having a time duration determined by the time period during which the transistor 350 is turned off.

The power drive circuit 346 includes first and second power drive transistors 366 and 368 of the NPN junction type, and first and second power switch transistors 370 and 372 of the PNP junction type. The emitter electrodes of the transistors 366 and 368 are connected directly to the ground line 70. The base electrode of the transistor 366 is connected through a line 374 with the collector electrode of the transistor 348 in the pilot drive circuit 345. The base electrode of the transistor 368 is connected through a line 376 to the collector electrode of the transistor 350 in the pilot drive circuit 345. The emitter electrodes of the transistors 370 and 372 are connected through a biasing diode 378 to the power line 68 and through a biasing resistor 380 to the ground line 70. The base electrode of the transistor 370 is connected through a biasing resistor 382 to the power line 68 and through a biasing resistor 384 to the collector electrode of the transistor 366. The base electrode of the transistor 372 is connected through a biasing resistor 386 to the power line 68 and through a biasing resistor 388 to the collector electrode of the transistor 368. The collector electrode of the first power switch transistor 370 is connected through a line 390 with the second group of the fuel injectors 46. Conversely, the collector electrode of the second power switch transistor 372 is connected through a line 392 with the first group of the fuel injectors 46.

The diode 378 and the resistor 380 apply a suitable bias voltage to the emitter electrodes of the first and second power switch transistors 370 and 372. The first pilot drive pulse is applied through the line 374 to turn on the first power drive transistor 366 which renders the transistor 370 fully conductive to energize the second group of the fuel injectors 46 with a power pulse having a time duration equal to the time duration of the injection pulse I. The second pilot drive pulse is applied through the line 376 to turn on the second power drive transistor 368 which renders the transistor 372 fully conductive to energize the first group of the fuel injectors 46 with a power pulse having a time duration equal to the time duration of the injection pulse I. Hence, the fuel injector driver 220 energizes the first group of the fuel injections 46 for a time period determined by the coincidence of a second stage pulse $S_2$ and an injection pulse I. Further, the fuel injector driver 220 energizes the second group of the fuel injectors 46 for a time period determined by the coincidence of a first stage pulse $S_1$ and an injection pulse I.

The duration of the first and second operating stages of the engine 10 is approximately equal in each engine operating cycle. However, as the speed of engine 10 increases, the frequency of the engine operating cycles likewise increases thereby to proportionately decrease the duration of the first and second operating stages. Further, since the duration of the first and second stage pulses $S_1$ and $S_2$ is coextensive with the duration of the first and second operating stages, the duration of the stage pulses $S_1$ and $S_2$ also decreases proportionally with increasing engine speed.

On the other hand, the duration of the injection pulses I increases with an increase in the demand for power from the engine 10. That is, as the throttle 40 is opened, the pressure in the intake manifold 26 rises thereby increasing the duration of the injection pulses I. In normal operation, the throttle 40 is opened to increase the speed of the engine 10. When this happens, the duration of the first and second stage pulses $S_1$ and $S_2$ decreases as the duration of the injection pulses I increases. Thus, the possibility of an overlap between the duration of the stage pulses $S_1$ and $S_2$ and the duration of the injection pulses I is created.

As previously described, the maximum duration of the injection pulses I is limited by the duration of either one of the first and second stage pulses $S_1$ and $S_2$ severally as determined by the duration of the first and second operating stages. However, under high speed conditions, it may be desirable that the duration of the injection pulses I exceed the duration of either one of the stage pulses $S_1$ and $S_2$ in order to apply a sufficient amount of fuel to the engine 10. Accordingly, the present invention provides an injection mode control circuit 394 for extending the maximum duration of the injection pulses I from the duration of either one of the first and second operating stages severally to the duration of both the first and second operating stages jointly.

Figure 3:
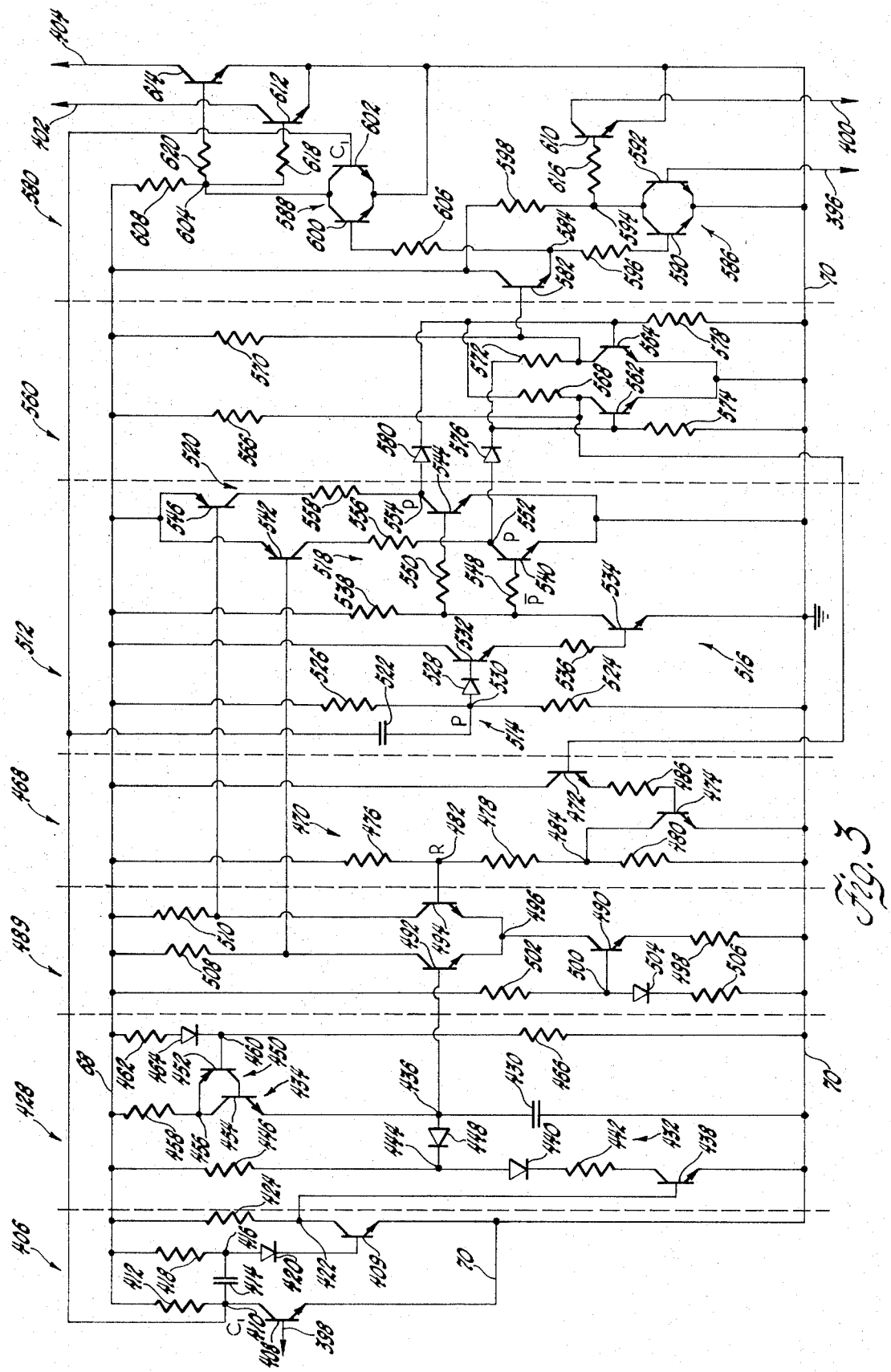
FIG. 3 is a schematic diagram of an injection mode control circuit incorporated within the electronic fuel injection system illustrated in FIG. 1.

Referring to FIGS. 1 and 3, the injection mode control circuit 394 is connected between the power line 68 and the ground line 70 and includes input lines 396 and 398 and output lines 400, 402 and 404. The input line 396 is connected to the second timing line 282. The input line 398 is connected directly to the injection pulse line 356. The output line 400 is connected to the junction 296 in the second control pulse generator 298. The output line 402 is connected to the base electrode of the first drive transistor 348 while the output line 404 is connected to the base electrode of the second drive transistor 350 in the pilot drive circuit 290.

More specifically, the injection mode control circuit 394 includes a delay pulse generator 406 having NPN junction transistors 408 and 409. The base electrode of the transistor 408 is connected directly to the junction 291 in the first control pulse generator 218. The emitter electrode of the transistor 408 is connected directly to the ground line 70. The collector electrode of the transistor 408 is connected directly to a junction 410. A biasing resistor 412 is connected between the power line 68 and the junction 360. A timing capacitor 414 is connected between a junction 416 the junction 410. A biasing resistor 418 is connected between the power line 68 and the junction 416. A temperature compensating diode 420 is connected between the junction 416 and the base electrode of the transistor 409. The emitter electrode of the transistor 409 is connected directly to the ground line 70. The collector electrode of the transistor 409 is connected directly to a junction 422. A transistor 368 which renders the transistor 372 fully conductive biasing resistor 424 is connected between the power line 68 and the junction 422.

Figure 4:
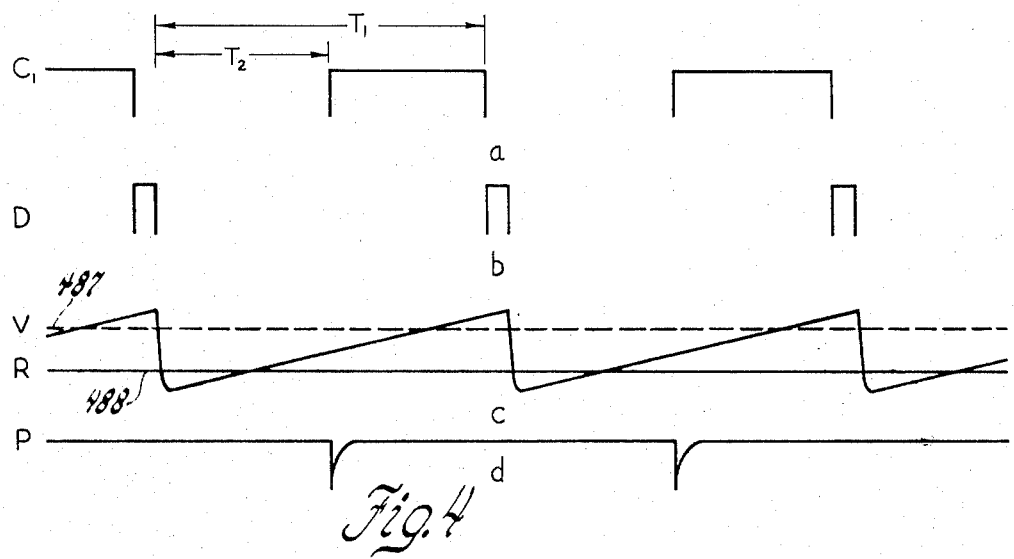
FIG. 4 is a graphic diagram of several waveforms useful in explaining the operation of the injection mode control circuit illustrated in FIG. 3.

The transistor 408 operates like the transistor 290 in the first control pulse generator 218 to develop the first control pulse $C_1$ as shown in FIG. 4a, at the junction 410. Specifically, a first control pulse $C_1$ is absent from the junction 410 when the transistor 408 is rendered fully conductive. With the transistor 408 turned on, the potential at the junction 410 is effectively clamped through the transistor 408 to the potential on the ground line 70. The transistor 409 is normally rendered fully conductive through the biasing action of the resistor 418 and the diode 420. As a result, the potential at the junction 416 is effectively clamped through the diode 420 and the base-emitter junction of the transistor 409 to the potential on the ground line 70. Thus, since the potential at the junction 410 is approximately equal to the potential at the junction 416, the capacitor 414 is relatively discharged. With the transistor 409 turned on, the junction 422 is effectively clamped to the ground line 70 through the transistor 409.

When a first control pulse $C_1$ is initiated at the junction 410, the transistor 408 is rendered fully nonconductive. With the transistor 408 turned off, the junction 410 is effectively disconnected from the ground line 70. Hence, the capacitor 414 charges through the resistor 412 to raise the potential at the junction 410 above the potential at the junction 416. The transistor 409 remains turned on through the biasing action of the resistor 418 and the diode 420.

Conversely, when a first control pulse $C_1$ is terminated at the junction 410, the transistor 408 is rendered fully conductive. With the transistor 408 turned on, the potential at the junction 410 is again effectively clamped through the transistor 408 to the potential on the ground line 70. Consequently, the potential at the junction 416 instantaneously drops below the potential on the ground line 70 thereby to render the transistor 409 fully nonconductive. With the transistor 409 turned off, the junction 422 is effectively disconnected from the ground line 42. Accordingly, a delay pulse D, as shown in FIG. 4b, is initiated at the junction 422. The voltage level of the delay pulse D is defined by the supply potential on the power line 68.

After the initiation of the delay pulse D, the potential at the junction 416 gradually rises as the capacitor 414 discharges through the resistor 418. Eventually, the potential at the junction 416 rises above the threshold potential of the transistor 409 thereby to render the transistor 409 fully conductive. With the transistor 409 again turned on, the delay pulse D at the junction 422 is terminated. Thus, the delay pulses D have a fixed duration determined by the RC time constant provided by the capacitor 414 and the resistor 418. Of course, the frequency of the delay pulses D is directly proportional to the speed of the engine 10.

A speed signal generator 428 includes a control capacitor 430, a discharging circuit 432 and a charging circuit 434. The capacitor 430 is connected between a junction 436 and the ground line 70. The discharging circuit 432 includes an NPN junction transistor 438. The base electrode of the transistor 438 is connected directly to the junction 422. The emitter electrode of the transistor 438 is connected directly to the ground line 70. a control diode 440 and a biasing resistor 442 are connected in series between a junction 444 and the collector electrode of the transistor 438. A biasing resistor 446 is connected between the power line 68 and the junction 444. A control diode 448 is connected between the junctions 436 and 444.

The charging circuit 434 includes a constant current source 450 having a PNP junction transistor 452 and an NPN junction transistor 454. The emitter electrode of the transistor 452 and the collector electrode of the transistor 454 are connected together at a junction 456. The collector electrode of the transistor 452 is connected directly to the base electrode of the transistor 454. The emitter electrode of the transistor 454 is connected directly to the junction 436. A biasing resistor 458 is connected between the power line 68 and the junction 456. The base electrode of the transistor 452 is connected directly to a junction 460. A biasing resistor 462 and a temperature compensating diode 464 are connected in series between the power line 68 and the junction 460. A biasing resistor 466 is connected between the junction 460 and the ground line 70.

The capacitor 430 develops a speed signal V, as shown in FIG. 4c, at the junction 436. The amplitude of the speed signal V is controlled by the discharging circuit 432 and the charging circuit 434. The transistors 452 and 454 in the current source 450 are continually rendered conductive in a constant current mode. As a result, a constant charging current is applied through the resistor 458 and the transistor 454 to the junction 436. The magnitude of the constant charging current determines the value of the constant charge rate on the capacitor 430. In turn, the magnitude of the charging current is determined by the amplitude of a bias voltage established at the junction 460 through the voltage divider action of the resistors 462 and 466.

When a delay pulse 423 is initiated at the junction 422, the transistor 438 is rendered fully conductive. With the transistor 438 turned on, the capacitor 430 discharges at a rapid discharge rate through the diode 440, the resistor 442 and the transistor 438. Consequently, the amplitude of the speed signal V at the junction 436 quickly decreases to a base level primarily defined by the voltage divider action of the resistors 442 and 446. Specifically, the amplitude of the speed signal V decreases in accordance with the RC time constant provided by the resistor 442 and the capacitor 430. The constant current source 450 continues to apply a charging current to the junction 436. However, the capacitor 430 discharges until the termination of the delay pulse 423. The duration of each of the delay pulses 423 is sufficient to insure that the amplitude of the speed signal V always reaches the base level before the termination of the delay pulse D.

When a delay pulse D is terminated at the junction 422, the transistor 438 is rendered fully nonconductive. With the transistor 438 turned off, the capacitor 430 charges at a constant rate defined by the current developed through the constant current source 450. Accordingly, the amplitude of the speed signal V linearly increases from the base level toward a maximum level defined by the supply potential on the power line 68. In particular, the rate of change in the amplitude of the speed signal 461 is determined by the magnitude of the charging current applied to the junction 436 by the current source 450. The capacitor 430 charges until the initiation of the next delay pulse D. In effect, the amplitude of the speed signal V increases over the duration of the first time period $T_1$ which represents a first portion of each engine cycle defined between the termination of each preceding delay pulse D and the initiation of each succeeding delay pulse D as determined by the initiation of each succeeding first control pulse $C_1$.

A reference signal generator 468 includes a voltage divider network 470 and a pair of NPN junction transistors 472 and 474. The voltage divider network 470 includes biasing resistors 476, 478 and 480. The resistor 476 is connected between a junction 482 and the power line 68. The resistor 478 is connected between the junction 482 and a junction 484. The resistor 480 is connected between the junction 484 and the ground line 70. The collector electrode of the transistor 472 is connected directly to the power line 68. A biasing resistor 486 is connected between the emitter electrode of the transistor 472 and the base electrode of the transistor 474. The emitter electrode of the transitor 474 is connected directly to the ground line 70. The collector electrode of the transistor 474 is connected directly to the junction 484.

The reference signal generator 468 develops a reference signal R as shown in FIG. 4c, at the junction 482. The amplitude of the reference signal R is substantially constant at either an upper reference level 487 or a lower reference level 488 depending upon the conductive condition of the transistor 474. When the transistor 474 is fully conductive, the reference signal R is at the lower reference level 488 as defined by the voltage divider action of the resistors 476 and 478. When the transistor 474 is rendered fully nonconductive, the amplitude of the reference signal R is substantially constant at the upper reference level 487 as defined by the voltage divider action of the resistors 476, 478 and 480. The significance of the upper reference level 487 and the lower reference level 488 will be more fully described later. At this point, it is sufficient to note that the transistor 474 is normally turned on so that the amplitude of the reference voltage R is normally at the lower reference level 488.

A differential switch or differential amplifier 489 includes NPN junction transistors 490, 492 and 494. The collector electrode of the transistor 490 is connected directly to a junction 496 between the emitter electrodes of the transistors 492 and 494. The emitter electrode of the transistor 490 is connected through a biasing resistor 498 to the ground line 70. The base electrode of th transistor 490 is connected directly to a junction 500. A biasing resistor 502 is connected between the junction 500 and the power line 68. A temperature compensating diode 504 and a biasing resistor 506 are connected in series between the junction 500 and the ground line 70. The base electrode of the transistor 492 is connected directly to the junction 436 in the speed signal generator 428. The base electrode of the transistor 494 is connected directly to the junction 482 in the reference signal generator 468. The collector electrode of the transistor 492 is connected through a biasing resistor 508 to the power line 68. Similarly, the collector electrode of the transistor 494 is connected through a biasing resistor 510 to the power line 68.

In the differential amplifier 489, the transistor 490 is rendered conductive in a constant current mode through the biasing action of the resistors 498, 500 and 506. Hence, the transistor 490 provides a constant current sink for the transistors 492 and 494 at the junction 496. In the conventional manner, the differential amplifier 488 is operable between first and second states. In the first state, the transistor 494 is rendered fully conductive while the transistor 492 is rendered fully nonconductive. Conversely, in the second state, the transistor 492 is rendered fully conductive and the transistor 494 is rendered fully nonconductive. The differential amplifier 488 switches from the first state to the second state when the amplitude of the speed signal V at the junction 436 exceeds the amplitude of the reference signal R at the junction 482. Alternately, the differential amplifier 488 switches from the second state to the first state when the amplitude of the reference signal R at the junction 482 exceeds the amplitude of the speed signal V at the junction 436.

A timing pulse generator 512 includes a differentiator 514, a pulse amplifier 516, and first and second logic gates 518 and 520. The differentiator 514 includes a coupling capacitor 522, a pair of biasing resistors 524 and 526, and a diode 528. The capacitor 522 is connected between a junction 530 and the junction 410 in the delay pulse generator 406. The biasing resistor 524 is connected between the junction 530 and the power line 68. The biasing resistor 526 is connected between the junction 530 and the ground line 70.

The pulse amplifier 516 includes NPN junction transistors 532 and 534. The base electrode of the transistor 532 is connected through the diode 528 to the junction 530 in the differentiator 514. The collector electrode of the transistor 532 is connected directly to the power line 68. The emitter electrode of the transistor 532 is connected through a biasing resistor 536 to the base electrode of the transistor 534. The emitter electrode of the transistor 534 is connected directly to the ground line 70. The collector electrode of the transistor 534 is connected through a biasing resistor 538 to the power line 68.

The first timing logic gate 518 includes an NPN junction transistor 540 and a PNP junction transistor 542. Similarly, the second timing logic gate 520 includes an NPN junction transistor 544 and a PNP junction transistor 546. The base electrode of the transistor 540 is connected through a biasing resistor 548 to the collector electrode of the transistor 534. The base electrode of the transistor 544 is connected through a biasing resistor 550 to the collector electrode of the transistor 534. The emitter electrodes of the transistors 540 and 544 are connected together directly to the ground line 70. The collector electrode of the transistor 540 is connected directly to a junction 552 while the collector electrode of the transistor 544 is connected directly to a junction 554. The base electrode of the transistor 542 is connected directly to the collector electrode of the transistor 492 in the differential amplifier 488. The base electrode of the transistor 546 is connected directly to the collector electrode of the transistor 494 in the differential amplifier 488. The emitter electrodes of the transistors 542 and 546 are connected together directly to the high power line 68. The collector electrode of the transistor 542 is connected through a biasing resistor 556 to the junction 552 while the collector electrode of the transistor 546 is connected through a biasing resistor 558 to the junction 554.

In the differentiator 514, the capacitor 522 combines with the resistors 524 and 526 to differentiate the first control pulses 288 appearing at the junction 410 in the delay pulse generator 406. As a result, timing pulses P of positive polarity as shown in FIG. 4d, are developed at the junction 530 in response to the initiation of each of the first control pulses 288. In effect a timing pulse P is initiated at the expiration of a second time period $T_2$ which represents a second portion of each engine cycle defined between the termination of each preceding delay pulse D and the initiation of each succeeding first control pulse $C_1$. Thus, the second time period $T_2$ is contained within and terminates within the first time period $T_1$ which represents the first portion of each engine cycle defined between the termination of each preceding delay pulse D and the termination of each succeeding first control pulse $C_1$. As the frequency of the first control pulses $C_1$ increases in response to an increase in the speed of the engine 10, the first and second time periods $T_1$ and $T_2$ proportionally decrease.

When a timing pulse P is absent from the junction 530, the transistor 532 is rendered relatively nonconductive through the biasing action of the diode 528 and the resistors 524 and 526. With the transistor 532 relatively nonconductive, the transistor 534 is rendered fully nonconductive through the biasing action of the resistor 536 and the transistor 532. However, when a timing pulse P is present at the junction 530, the transistor 532 is momentarily rendered highly conductive. With the transistor 532 momentarily highly conductive, the transistor 534 is momentarily fully conductive. With the transistor 534 momentarily turned on, the timing pulse P at the junction 530 is amplified and inverted to provide an inverted timing pulse $\overline{P}$ at the collector electrode of the transistor 534.

When the differential amplifier 489 is in the first state, the transistor 494 is rendered fully conductive and the transistor 492 is rendered fully nonconductive. With the transistor 494 turned on, the transistor 546 in the logic gate 520 is rendered fully conductive through the biasing action of the transistors 490 and 494 and the resistors 498 and 510. With the transistor 492 turned off, the transistor 542 in the logic gate 518 is rendered fully nonconductive through the biasing action of the resistor 498. Conversely, when the differential amplifier 489 is in the second state, the transistor 492 is rendered fully conductive and the transistor 494 is rendered fully nonconductive. With the transistor 492 turned on, the transistor 542 in the logic gate 518 is rendered fully conductive through the biasing action of the transistors 490 and 492 and the resistors 498 and 508. With the transistor 492 turned off, the transistor 546 in the logic gate 512 is rendered fully nonconductive through the biasing action of the resistor 476.

When the transistor 534 is turned off so that an inverted timing pulse $\overline{P}$ is not present at the collector electrode of the transistor 534, the transistor 540 in the logic gate 518 is conditioned to turn on through the biasing action of the resistors 538 and 548 while the transistor 544 in the logic gate 520 is conditioned to turn on through the biasing action of the resistors 538 and 550. If the differential amplifier 488 is in the second state so that the transistor 542 is turned on, the transistor 540 in the logic gate 518 is rendered fully conductive in response to the absence of an inverted timing pulse $\overline{P}$. With the transistor 540 turned on, the junction 552 is effectively clamped to the ground potential on the ground line 70 through the transistor 540. On the other hand, if the differential amplifier 488 is in the first state so that the transistor 546 is turned on, the transistor 544 in the logic gate 520 is rendered fully conductive in response to the absence of an inverted timing pulse $\overline{P}$. With the transistor 544 turned on, the junction 554 is effectively clamped to the ground potential on the ground line 70 through the transistor 544. Hence, regardless of the state of the differential amplifier 488, no timing pulses P are developed at the junctions 552 and 554 when the transistor 534 is turned off.

When the transistor 534 is turned on so that an inverted timing pulse $\overline{P}$ is present at the collector electrode of the transistor 534, the transistors 540 and 544 are both momentarily turned off. The transistor 540 in the logic gate 518 is rendered fully nonconductive through the biasing action of the resistors 538 and 548 while the transistor 544 in the logic gate 520 is rendered fully nonconductive through the biasing action of the resistors 538 and 550. With the transistor 540 momentarily turned off, the junction 552 is momentarily unclamped from the ground line 70 to develop a timing pulse P of positive polarity at the junction 552, provided that the differential amplifier 448 is in the second state so that the transistor 542 is turned on. Similarly, with the transistor 544 momentarily turned off, the junction 554 is unclamped to develop a timing pulse P of positive polarity at the junction 554, provided that the differential amplifier 488 is in the first state so that the transistor 546 is turned on. Accordingly, when the differential amplifier 488 is in the first state, any timing pulses P developed by the differentiator 514 are amplified by the pulse amplifier 516 and applied to the junction 554 by the second logic gate 520. Alternately, when the differential amplifier 488 is in the second state, any timing pulses P developed by the differentiator 514 are amplified by the pulse amplifier 516 and applied to the junction 552 by the first logic gate 518.

A pulse switch or bistable multivibrator 560 includes a pair of NPN junction transistors 562 and 564. The emitter electrodes of the transistors 562 and 564 are connected together to the ground line 70. The collector electrode of the transistor 562 is connected through a biasing resistor 566 to the power line 68 and is connected through a biasing resistor 568 to the base electrode of the transistor 564. Further, the collector electrode of the transistor 562 is connected directly to the base electrode of the transistor 472. The collector electrode of the transistor 564 is connected through a biasing resistor 570 to the power line 68 and is connected through a biasing resistor 572 to the base electrode of the transistor 562. The base electrode of the transistor 562 is connected through a biasing resistor 574 to the ground line 70 and is connected through a coupling diode 576 to the junction 552 in the timing pulse generator 512. The base electrode of the transistor 564 is connected through a biasing resistor 578 to the ground line 70 and is connected through a coupling diode 580 to the junction 554 in the timing pulse generator 512.

When a timing pulse P appears at the junction 554, it is coupled through the diode 580 and the resistor 578 to the base electrode of the transistor 564. As a result, the transistor 564 is rendered fully conductive. With the transistor 564 turned on, the transistor 562 is rendered fully nonconductive through the biasing action of the transistor 564 and the resistor 572. With the transistor 562 turned off, the transistor 564 is maintained turned on through the biasing action of the resistors 566, 568 and 578. This is the first state of the bistable multivibrator 560. Alternately, when a timing pulse P appears at the junction 552, it is coupled through the diode 544 and the resistor 574 to the base electrode of the transistor 562. Consequently, the transistor 562 is rendered fully conductive. With the transistor 562 turned on, the transistor 564 is rendered fully nonconductive through the biasing action of the transistor 562 and the resistor 568. With the transistor 564 turned off, the transistor 562 is maintained turned on through the biasing action of the resistors 570, 572 and 574. This is the second state of the bistable multivibrator 560.

It will now be apparent that whether the bistable multivibrator 560 resides in the first state or in the second state is dependent upon the relative relationship between the amplitude of the speed signal V and the amplitude of the reference signal R at the initiation of each timing pulse P. Thus, each timing pulse P which is initiated when the amplitude of the speed signal V exceeds the amplitude of the reference signal R, is applied to trigger the bistable multivibrator 560 to the second state. Alternately, each timing pulse P which is initiated when the amplitude of the reference signal R exceeds the amplitude of the speed signal V is applied to trigger the bistable multivibrator 560 to the first state. Of course, once the bistable multivibrator 560 is triggered to one of the first and second states, it remains in that state until it is triggered to the other of the first and second states.

When the bistable multivibrator 560 is in the first state, the transistor 562 is rendered fully nonconductive. With the transistor 562 turned off, the transistor 472 is rendered fully conductive through the biasing action of the resistor 566. With the transistor 472 turned on, the transistor 474 is rendered fully conductive through the biasing action of the resistor 486 and the transistor 472. With the transistor 474 turned on, the reference signal R is at the lower reference level 488. The lower reference level 488 is selected such that the amplitude of the speed signal V joint falls below the lower reference level 488 as the speed of the engine 10 reaches a critical speed limit at which the duration of the first and second stage pulses $S_1$ and $S_2$ is approximately equal to the duration of the injection pulses I. Alternately, when the bistable multivibrator 560 is in the second state, the transistor 562 is rendered fully conductive. With the transistor 562 turned on, the transistor 472 is rendered fully nonconductive through the biasing action of the transistor 562. With the transistor 472 turned off, the transistor 474 is rendered fully nonconductive. With the transistor 474 turned off, the reference signal R is at the upper reference level 487. The upper reference level 487 is selected such that the difference between the upper reference level 487 and the lower reference level 488 provides a sufficient hysteresis to prevent the differential switch 489 and the bistable switch 560 from hunting or oscillating between the first and second states due to minor fluctuations in the speed of the engine 10 about the critical speed limit.

An injection mode switch 580 includes a buffer transistor 582 of the NPN junction type. The base electrode of the transistor 582 is connected directly to the collector electrode of the transistor 564 in the bistable multivibrator 560. The collector electrode of the transistor 582 is connected directly to the power line 68. The emitter electrode of the transistor 582 is connected directly to a junction 584. Further, the injection mode switch 580 includes first and second injection logic gates 586 and 588.

The first injection logic gate 586 includes a pair of NPN junction transistors 590 and 592. The emitter electrodes of the transistors 590 and 592 are connected together to the ground line 70. The collector electrodes of the transistors 590 and 592 are connected together at a junction 594. A biasing resistor 596 is connected between the junction 584 and the base electrode of the transistor 590. The base electrode of the transistor 592 is connected directly to the input line 396. A biasing resistor 598 is connected between the power line 68 and the junction 594.

The second injection logic gate 588 includes a pair of NPN junction transistors 600 and 602. The emitter electrodes of the transistors 600 and 602 are connected together to the ground line 70. The collector electrodes of the transistors 600 and 602 are connected together at a junction 604. A biasing resistor 606 is connected between the junction 584 and the base electrode of the transistor 600. The base electrode of the transistor 602 is connected directly to the input line 396. A biasing resistor 608 is connected between the power line 68 and the junction 604.

In addition, the injection mode switch 580 includes output transistors 610, 612 and 614 of the NPN junction type. The emitter electrodes of the transistors 610, 612 and 614 are connected directly to the ground line 70. A biasing resistor 616 is connected between the junction 594 and the base electrode of the transistor 610. The collector electrode of the transistor 610 is connected directly to the output line 400. A biasing resistor 618 is connected between the junction 604 and the base electrode of the transistor 612. The collector electrode of the transistor 612 is connected directly to the output line 402. A biasing resistor 620 is connected between the junction 604 and the base electrode of the transistor 614. The collector electrode of the transistor 614 is connected directly to the output line 404.

When the speed of the engine 10 is below the critical speed limit, the bistable multivibrator 560 switches to the second state in which the transistor 564 is rendered fully nonconductive. With the transistor 564 turned off, the buffer transistor 582 is rendered fully conductive through the biasing action of the resistor 570. With the transistor 582 turned on, the transistor 590 in the first injection logic gate 586 is rendered fully conductive through the biasing action of the resistor 596. With the transistor 590 turned on, the transistor 610 is rendered fully nonconductive through the biasing action of the resistor 594 and the transistor 590. With the transistor 610 turned off, the junction 296 is unclamped so that the operation of the transistor 290 in the first control pulse generator 218 is as previously described.

Further, when the transistor 582 is turned on, the transistor 600 in the second injection logic gate 588 is rendered fully conductive through the biasing action of the resistor 606. With the transistor 600 turned on, the output transistor 612 is rendered fully nonconductive through the biasing action of the resistor 618 and the transistor 600 while the output transistor 614 is rendered fully nonconductive through the biasing action of the resistor 620 and the transistor 600. With the output transistor 612 turned off, the base electrode of the first pilot drive transistor 358 is unclamped so that the operation of the first pilot drive transistor 358 is as previously described. Similarly, with the output transistor 614 turned off, the base electrode of the second pilot drive transistor 350 is unclamped so that the operation of the second pilot drive transistor 350 is as previously described.

When the speed of the engine 10 exceeds the critical speed limit, the bistable multivibrator 560 switches to the first state in which the transistor 564 is rendered fully conductive. With the transistor 564 turned on, the transistor 582 is rendered fully nonconductive through the biasing action of the transistor 564. With the transistor 582 turned off, the transistor 590 in the first injection logic gate 586 is rendered fully nonconductive. With the transistor 590 turned off, the conductivity of the output transistor 610 is dependent upon the conductivity of the transistor 592 in the first injection logic gate 586. When a second stage pulse $S_2$ is absent from the input line 396 during the first operating stage of each engine cycle, the transistor 592 is rendered fully conductive. With the transistor 592 turned on, the output transistor 610 is rendered fully nonconductive through the biasing action of the resistor 616 and the transistor 590. Thus, during the first operating stage of each engine cycle, the operation of the transistor 490 in the first control pulse generator 218 is as previously described.

Conversely, when a second stage pulse $S_2$ is present on the input line 396 during the second operating stage of each engine cycle, the transistor 592 is rendered fully nonconductive. With the transistor 592 turned off and the transistor 590 turned off, the output transistor 610 is rendered fully conductive though the biasing action of the resistors 594 and 598. With the output transistor 610 turned on, the junction 296 is effectively clamped to the ground line 70 through the output line 400 and the transistor 560 thereby to disable the transistor 290. As a result, the first control pulse $C_1$ normally produced at the junction 296 in response to the onset of the second operating stage of each engine cycle is effectively inhibited. Nevertheless, the first control pulse $C_1$ is developed as usual at the junction 410 in the injection mode control circuit 394.

With the junction 296 effectively clamped to the ground line 70 through the output transistor 610, the second control pulse $C_2$ initiated at the junction 328 during the first operating stage may now extend into the second operating stage. That is, the discharge of the capacitor 310 in the second control pulse generator 298 may continue during the second operating stage. Hence, only one injection pulse I is developed at the junction 240 during each engine cycle. This injection pulse I is initiated in response to the onset of the first operating stage and may terminate any time during the second operating stage as determined by the discharge rate of the capacitor 310. Accordingly, the maximum duration of the injection pulses I is necessarily extended from the duration of either one of the first and second operating stages severally to the duration of both the first and second operating stages jointly.

In addition, with the transistor 582 turned off, the transistor 600 in the second injection logic gate 588 is rendered fully nonconductive. With the transistor 600 turned off, the conductivity of the output transistors 612 and 614 is dependent upon the conductivity of the transistor 602 in the second injection logic gate 588. When an injection pulse I is absent from the input line 398, the transistor 602 is rendered fully conductive. With the transistor 602 turned on, the transistor 612 is rendered fully nonconductive through the biasing action of the resistor 618 and the transistor 602 while the transistor 614 is rendered fully nonconductive through the biasing action of the resistor 620 and the transistor 602.

However, when an injection pulse I is present on the input line 398, the transistor 602 is rendered fully nonconductive. With the transistor 602 turned off, the transistor 612 is rendered fully conductive through the biasing action of the resistors 608 and 618 while the transistor 614 is rendered fully conductive through the biasing action of the resistors 608 and 620. With the output transistor 612 turned on, the base electrode of the first pilot drive transistor 348 is effectively connected to the ground line 70 through the transistor 612 thereby to render the first pilot drive transistor 348 fully nonconductive. Similarly, with the output transistor 614 turned on, the base electrode of the second pilot drive transistor 350 is effectively connected to the ground line 70 through the transistor 614 thereby to render the second pilot drive transistor 350 fully nonconductive. The first and second pilot drive transistors 348 and 350 are simultaneously turned off for the duration of the injection pulses I which are now produced in response to the onset of the first operating stage only. As previously described, the first bank of the fuel injectors 46 are energized when the second pilot drive transistor 350 is turned off while the second bank of the fuel injectors 46 are energized when the first pilot drive transistor 348 is turned off.

In this manner, both the first and second banks of the fuel injectors 46 are simultaneously energized for the duration of each of the injection pulses I developed on the input line 398. Moreover, the duration of the injection pulses I may exceed the duration of either one of the stage pulses $S_1$ and $S_2$ as determined by the duration of the first and second operating stages. Thus, the total time period during which the first and second banks of the fuel injectors 46 are energized during each engine cycle is increased. As a result, more fuel is applied to the engine 10 to meet the increased demand for power from the engine 10. In effect, the maximum time period during which the first and second banks of the fuel injectors 46 may be energized is extended from the duration of either one of the first and second operating stages severally to the duration of both the first and second operating stages jointly.

It will now be apparent that the present invention provides a simple but effective technique for switching the operation of at least a pair of fuel injectors from independent energization per engine cycle to simultaneous energization per engine cycle as the desired energization time period for each of the fuel injectors approaches the maximum time period available for independent energization of each of the fuel injectors per engine cycle. However, it is to be noted that the illustrated embodiment of the invention is shown for demonstrative purposes only and that various alterations and modifications may be made to the illustrated embodiment without departing from the spirit and scope of the invention.

What is claimed is:

1. In an internal combustion engine exhibiting periodic engine cycles having a frequency proportional to the speed of the engine and including at least first and second operating stages of approximately equal duration per engine cycle proportional to the duration of the engine cycle, the combination comprising: means for developing injection pulses each initiated in response to the onset of the first and second operating stages and each having a duration determined as a function of at least one engine operating parameter; means for developing a speed signal having an amplitude which increases over the duration of a first portion of each engine cycle such that the amplitude of the speed signal is inversely related to the speed of the engine; means for developing a reference signal having an amplitude which is substantially constant at a reference level corresponding to an engine speed at which the duration of the injection pulses is approximately equal to the duration of the first and second operating stages; means including a differential switch operable to a first state when the amplitude of the reference signal exceeds the amplitude of the speed signal and operable to a second state when the amplitude of the speed signal exceeds the amplitude of the reference signal; means for developing timing pulses each initiated at the expiration of a second portion of each engine cycle which terminates within the first portion; means including a bistable switch operable to a first state from a second state when the differential switch is in the first state at the initiation of a timing pulse; and means including a first fuel injector for applying fuel to the engine in an amount determined by the duration of each of the injection pulses initiated in response to the onset of the first operating stage and including a second fuel injector for applying fuel to the engine in an amount determined by the duration of each of the injection pulses initiated in response to the onset of the second operating stage when the bistable switch is in the second state and for applying fuel to the engine in an amount determined by the duration of each of the injection pulses initiated in response to the onset of the first operating stage when the bistable switch is in the first state; whereby the maximum duration of the injection pulses is extended beyond the duration of either one of the first and second operating stages.

2. In an internal combustion engine exhibiting periodic engine cycles having a frequency proportional to the speed of the engine and including at least first and second operating stages of approximately equal duration per engine cycle proportional to the duration of the engine cycle, the combination comprising: means for developing injection pulses each initiated in response to the first and second operating stages and each having a duration determined as a function of at least one engine operating parameter; means including a speed signal generator for developing a speed signal having an amplitude which increases from a base level toward a maximum level over the duration of a first portion of each engine cycle so that the amplitude of the speed signal is inversely related to the speed of the engine; means including a reference signal generator for developing a refernce signal having an amplitude which is substantially constant; means including a differential switch operable to a first state when the amplitude of the reference signal exceeds the amplitude of the speed signal and operable to a second state when the amplitude of the speed signal exceeds the amplitude of the reference signal; means including a timing pulse generator for developing timing pulses each initiated at the expiration of a second portion of each engine cycle which is terminated within the first fixed portion; means including a bistable switch operable to a first state from a second state when the differential switch is in the first state at the initiation of a timing pulse; the reference signal generator including means for defining the amplitude of the reference signal at a lower reference level located between the base level and the maximum level at a point corresponding to an engine speed at which the duration of the first and second operating stages is approximately equal to the duration of the injection pulses and for defining the amplitude of the reference signal at an upper reference level located between the base level and the maximum level at a point corresponding to a second engine speed sufficiently below the first engine speed to prevent oscillation of the bistable switch; and means including a first fuel injector for applying fuel to the engine in an amount directly related to each of the injection pulses initiated in response to the onset of the first operating stage and including a second fuel injector for applying fuel to the engine in an amount determined by the duration of each of the injection pulses initiated in response to the onset of the second operating stage when the bistable switch is in the second state and for applying fuel to the engine in an amount determined by the duration of each of the injection pulses initiated in response to the onset of the first operating stage when the bistable switch is in the first state; whereby the duration of the injection pulses is extended beyond the duration of either one of the first and second operating stages.

3. In an internal combustion engine exhibiting periodic engine cycles having a frequency proportional to the speed of the engine and having at least first and second operating stages of approximately equal duration per engine cycle proportional to the duration of the engine cycle, the combination comprising: means including a first control pulse generator for developing first control pulses each initiated in response to the onset of the first and second operating stages and each terminated at the expiration of a first predetermined duration; means including a second control pulse generator for developing second control pulses each initiated after the initiation of a corresponding first control pulse and each terminated after the termination of the corresponding first control pulse at the expiration of a second predetermined duration; and means for developing injection pulses each initiated in response to the initiation of a first control pulse and each terminated in response to the termination of the corresponding second control pulse; means including a speed signal generator for developing a speed signal having an amplitude which increases over the duration of a first portion of each engine cycle such that the amplitude of the speed signal is inversely related to the speed of the engine; means for developing a reference signal having an amplitude which is substantially constant at a reference level corresponding to an engine speed at which the duration of the injection pulses is approximately equal to the duration of the first and second operating stages; means including a differential switch operable to a first state when the amplitude of the reference signal exceeds the amplitude of the speed signal and operable to a second state when the amplitude of the speed signal exceeds the amplitude of the reference signal; and means including a timing pulse generator for developing timing pulses each initiated in response to the initiation of a first control pulse such that each of the timing pulses is initiated at the expiration of a second portion of each engine cycle which terminates within the first portion; means including a bistable switch operable to a first state from a second state when the differential switch is in the first state at the initiation of a timing pulse; and means including a first fuel injector for applying fuel to the engine in an amount determined by the duration of each of the injection pulses initiated in response to the onset of the first operating stage and including a second fuel injector for applying fuel to the engine in an amount determined by the duration of each of the injection pulses initiated in response to the onset of the second operating stage when the bistable switch is in the second state and for applying fuel to the engine in an amount determined by the duration of each of the injection pulses initiated in response to the onset of the first operating stage when the bistable switch is in the first state; whereby the maximum duration of the injection pulses is extended beyond the duration of either one of the first and second operating stages. fuel to the engine in anamount determind by the duration of

* * * * *